No. 777,815.

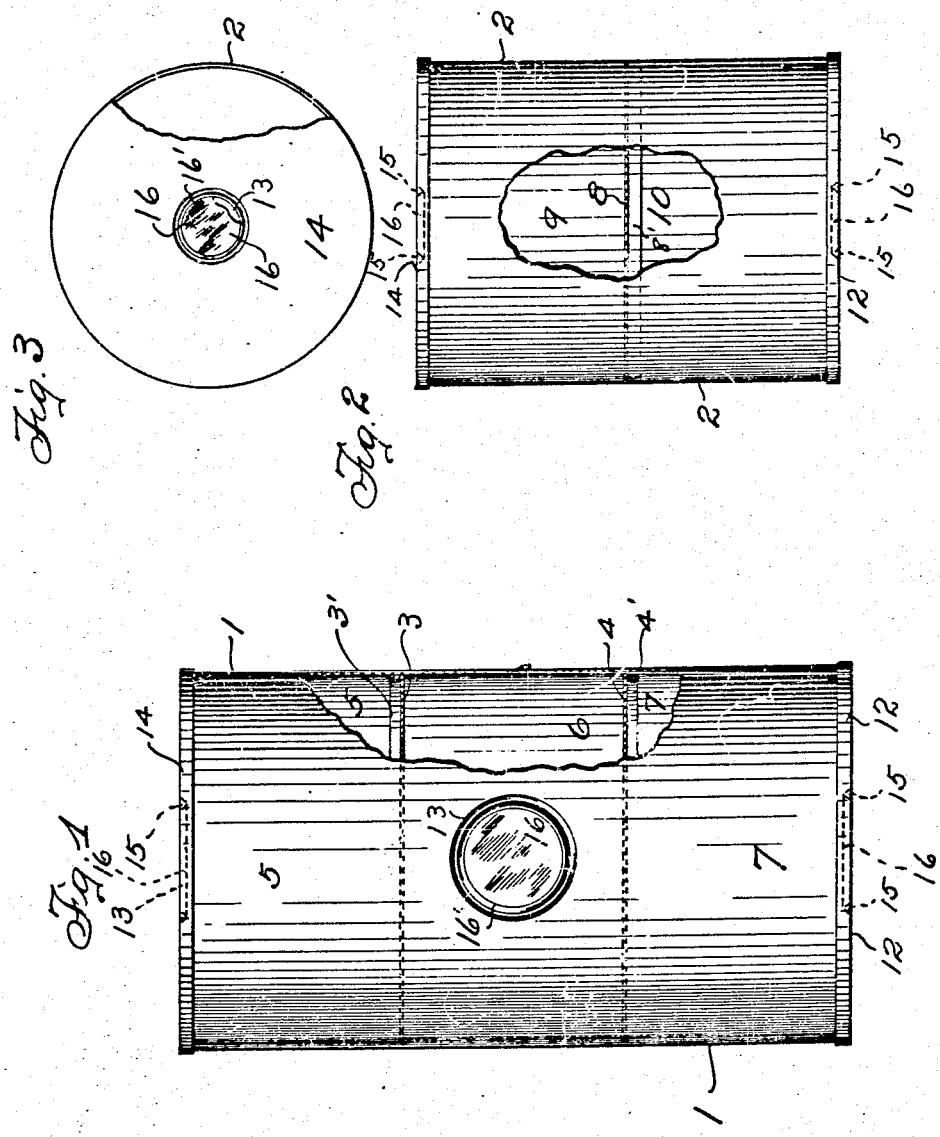

Patented December 20, 1904.

UNITED STATES PATENT OFFICE.

GEORGE H. STEWART, OF LOS ANGELES, CALIFORNIA.

HERMETICALLY-SEALED MULTIPLE-COMPARTMENT VESSEL OR CAN.

SPECIFICATION forming part of Letters Patent No. 777,815, dated December 20, 1904.

Application filed July 1, 1904. Serial No. 215,025.

*To all whom it may concern:*

Be it known that I, GEORGE H. STEWART, a citizen of the United States, residing at Los Angeles, county of Los Angeles, State of California, have invented and discovered a new and useful Improvement in Hermetically-Sealed Multiple-Compartment Vessels or Cans for Milk and other Food Products; and I do hereby declare the following to be a full, clear, and exact description of the invention, such as will enable others skilled in the art to which it appertains to make and use the same.

This invention relates to improvements in the hermetically-sealed multiple-compartment vessel or can for milk and other food products; and the objects of my improvement are, first, to provide packages in which milk and other food products are preserved that will permit portions of the products in the packages to remain hermetically sealed while other portions of the food therein are being used or consumed; second, to keep uncontaminated perishable food product free from the admission of air and germs until ready for use, and, third, to place upon the market hermetically-sealed food products in compartment-packages for instalment use for consumers at less cost than the same amount of the same product has heretofore been offered to the public, reference being made to the accompanying drawings and to the reference-numerals marked thereon.

The invention consists, essentially, in the construction, combination, and arrangement of the several parts, as will be hereinafter fully described in the specification, shown upon the drawings appended hereto, and specifically pointed out in the claim made a part hereof.

I attain these objects by the construction and arrangement of the several parts illustrated in the accompanying drawings, in which—

Figure 1 is a view in elevation of one of my three-compartment packages, a part thereof broken away. Fig. 2 is a view in elevation of one of my improved two-compartment packages, part thereof broken away; and Fig. 3 is a view in elevation of the top or bottom cap for the compartment-package shown upon Figs. 1 and 2 of the drawings, part thereof broken away.

Similar reference-numerals refer to like parts throughout the several views.

The reference-numeral 1 designates the package shown upon Fig. 1 of the drawings, a part of the body portion thereof about the longitudinal center broken away in order to illustrate the construction of the two horizontal hermetically-sealed diaphragms 3 and 4 secured within the package.

The reference-numeral 5 denotes the uppermost compartment, the numeral 6 indicates the middle compartment, and the numeral 7 refers to the lowermost compartment, of my improved package illustrated upon Fig. 1 of the drawings, each of said compartments hermetically sealed one from the other.

The reference-numeral 2 indicates the package shown upon Fig. 2 of the drawings, a portion of the body portion of the package broken away about the longitudinal center thereof, showing a single horizontal hermetically-sealed septum or diaphragm 8 secured within the package.

The reference-numeral 9 denotes the upper compartment, and the numeral 10 designates the lower compartment, of the package shown upon Fig. 2 of the drawings, each of said compartments being hermetically sealed the one from the other.

The diaphragms or septa 3 and 4 shown upon Fig. 1 and the diaphragm or septum 8 illustrated upon Fig. 2 of the drawings are alike in construction, being provided, preferably with integrally-made flanges 3′ 4′ 8′, respectively. The said diaphragm 3 is made with the flange 3′ to project upwardly toward the top of the package when soldered or otherwise hermetically sealed to the inner surface of the package. The package may be made of metal, glass, or any suitable material—preferably of tin. The said diaphragm 4 is constructed with the preferably integrally made flange 4′, and when hermetically sealed to the inner surface of the package the said flange projects downwardly toward the bottom of the package. The said diaphragm 8 is constructed with the flange 8′ preferably forming a part of the diaphragm when hermetically sealed in place upon the inner surface of the package to project downwardly toward the bottom of the package. The said diaphragm 8 may, if desired, be provided with two flanges when hermetically sealed to the inner surface of the package, one flange projecting upwardly toward the top and the other flange projecting downwardly toward the bottom of the package. The diaphragms may be made without a flange.

The bottom caps 12 12 and the top caps 14 14 of the packages illustrated upon Figs. 1 and 2 of the drawings are provided with openings 13 13 and are alike in construction, provided with annular depressions or seats 15 15. The bottom caps 12 12 and the top caps 14 14, hermetically sealed upon the body portion of the packages 1 2, having the seats 15 15, (shown upon Figs. 1 and 2 of the drawings,) are provided with covers or disks 16 16, having flanges 16' 16', adapted to be hermetically sealed in said seats over the openings 13 13.

The middle or central compartment 6 of the package illustrated upon Fig. 1 of the drawings is provided with an opening or perforation 13 in the body portion or wall thereof, having a depression or seat 15 around the same, and the disk 16, adapted to be hermetically sealed therein in like manner as the disks 16 16 are sealed upon the bottom and top caps over the openings or perforations 13 13 made therein.

The object and purpose of this invention will be readily understood from the foregoing description, taken in connection with the drawings appended hereto, and set forth in the hereinafter-mentioned claim made a part hereof.

The many advantages of my improved packages are obvious and manifest. There are many consumers of milk, cream, and other food products who require them and can afford to use at each meal only a limited portion of even the smallest quantity of such food products as are now for sale upon the markets. The said food products can be purchased more economically when bought in larger quantities than many consumers can afford at present to purchase these indispensable products of food. Moreover, there are many persons who cannot provide themselves with ice and other refrigerating articles to keep and preserve perishable food products hermetically sealed when once opened and exposed to the atmosphere.

By the use of my improved packages perishable articles of food can be bought at one time in larger quantities than heretofore, and thereby savings inure to the poor and needy consumers. Besides, the said economically-purchased food products hermetically sealed in my improved "instalment" packages can be consumed upon the instalment plan. Furthermore, the many unfortunate and neglected poor, particularly in large and crowded cities, are without means with which to purchase refrigerators and other modern cooling apparatus to keep in a sanitary condition the food products now sold hermetically sealed in the smallest packages when once the contents of such packages are exposed to microbes everywhere floating in the contaminating atmosphere.

It is obvious that many variations and changes in the details of construction and arrangement of my invention will readily suggest themselves to persons skilled in the art and still be within the spirit and scope of my invention.

I do not desire to confine this invention to the specific construction and arrangement of the parts herein shown and described, and the right is reserved to make all changes in and modifications of the same as come within the spirit of this invention; but I do desire to secure as my invention all features of construction and equivalents thereof that come within the scope of my improvement as herein shown, described, and illustrated upon the drawings appended hereto.

Having described my invention, what I do claim, and desire to secure by Letters Patent, is—

As an improved article of manufacture, a vessel or can, the body of which is formed of one piece, said vessel or can having one or more septa or diaphragms provided with flanges, hermetically sealed upon the inner surface thereof, and forming separate compartments within the vessel, the said vessel or can being provided with openings in the walls of the compartments, and disks or covers for said openings adapted to be hermetically sealed thereon to exclude the air from the compartments of the vessel or can, all substantially as described.

In testimony whereof I have signed my name to this specification in the presence of the two subscribing witnesses.

GEORGE H. STEWART.

Witnesses:
ANNA MORGAN,
G. WOODCOCK.